Nov. 3, 1964   A. L. SHOOK   3,155,264

CASES FOR PHOTOGRAPHIC FILM

Filed Feb. 15, 1962   2 Sheets-Sheet 1

INVENTOR.
ALVIN LEE SHOOK
BY Ogle R. Singleton
ATTORNEY

Nov. 3, 1964  A. L. SHOOK  3,155,264
CASES FOR PHOTOGRAPHIC FILM
Filed Feb. 15, 1962  2 Sheets-Sheet 2
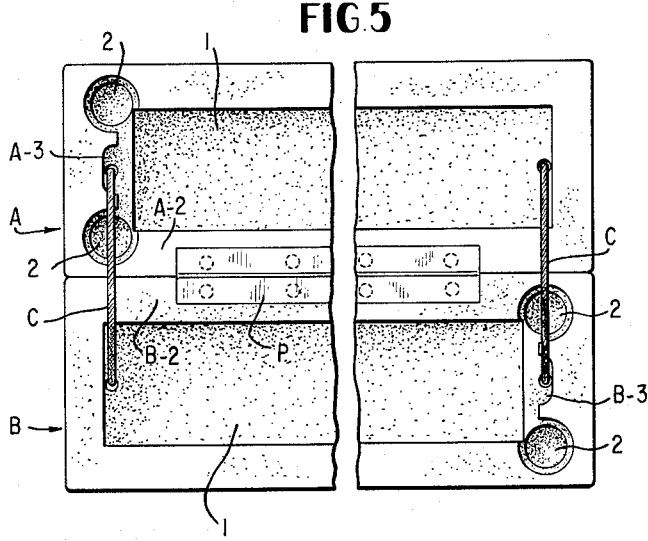
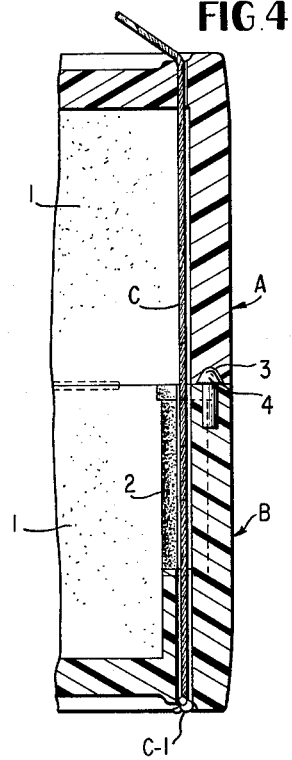
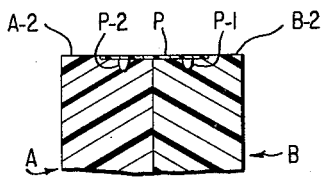
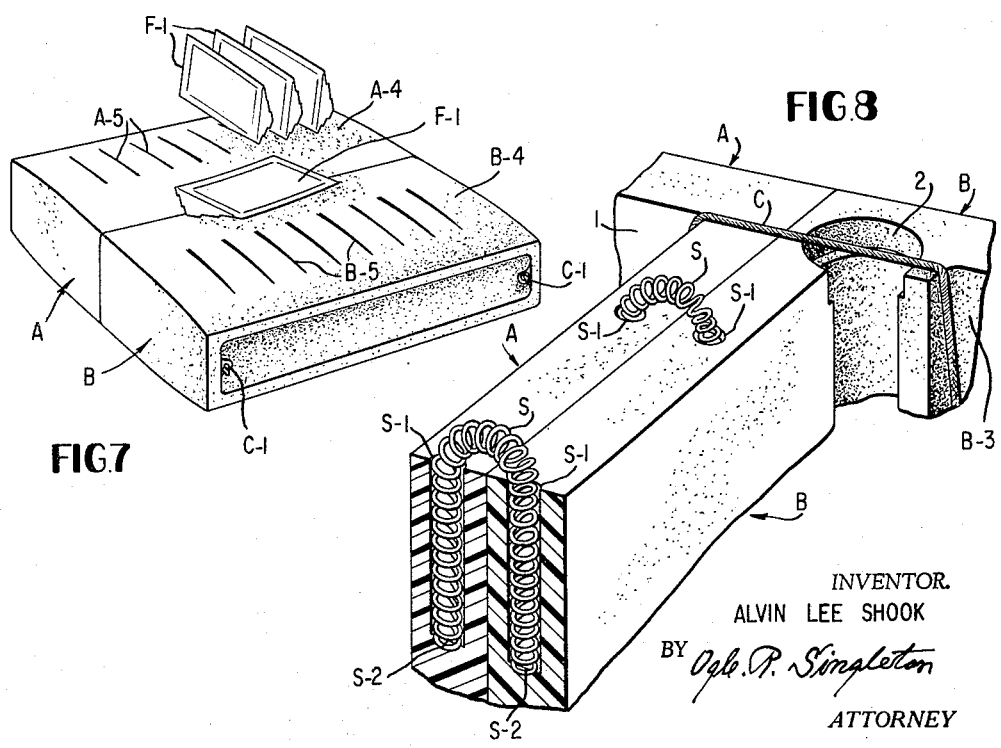
INVENTOR.
ALVIN LEE SHOOK
BY Ogle P. Singleton
ATTORNEY

United States Patent Office 3,155,264
Patented Nov. 3, 1964

3,155,264
CASES FOR PHOTOGRAPHIC FILM
Alvin Lee Shook, 617 W. Bullock St., Denison, Tex.
Filed Feb. 15, 1962, Ser. No. 173,439
1 Claim. (Cl. 220—4)

My invention consists in a new and useful improvement in cases for photographic film, and is designed more particularly to provide a carrying case for films for a polaroid camera, which maintains the films at a degree of temperature below that at which the films will be adversely affected.

In a thermal conductivity test of my improved case, it was subjected to an ambient external temperature of 120° F., for a period of four hours. At the termination of this time, the inside temperature of the case was 74° F.

My improved case comprises a pair of identical members composed of molded, expandable polystyrene. Each member has a rectangular receptacle capable of containing three packages of film, and a pair of cylindrical receptacles, each capable of containing a vial of liquid for treating the film after use. The members are suitably hingedly connected and have an elastic cord so disposed as to hold the members in both open and closed positions, and to serve as a carrying handle when the members are so related as to close the case.

While I show in the drawings and hereinafter fully describe certain specific embodiments of my invention, it is to be distinctly understood that I do not consider my invention to be limited to said embodiments but refer for its scope to the claim appended hereto.

In the drawings:

FIG. 4 is a vertical section on the line 4—4 of FIG. 3, in the direction of the arrows.

FIG. 5 is a top plan of the opened case.

FIG. 6 is an enlarged, fragmentary vertical section on the line 6—6 of FIG. 2.

FIG. 7 is a top plan of the side of the case in closed position.

FIG. 8 is a fragmentary perspective, partly in section, of a modified form of the case in open position.

Figure 2:
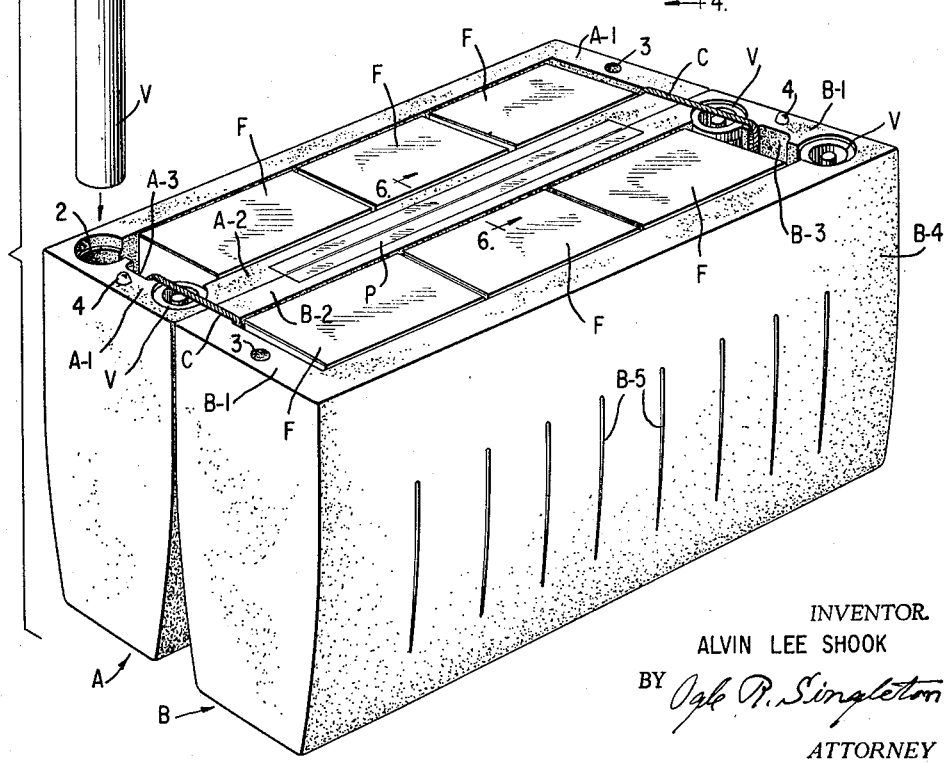
FIG. 2 is a perspective of the case in open position.

As shown in the drawings, my improved case comprises two identical members A and B composed of molded, expandable polystyrene. Since they are identical, a description of one suffices. The member has a rectangular receptacle 1 suitably dimensioned for containing three packages of film F, and a pair of vertical, cylindrical receptacles 2 for containing vials V of liquid for treating the film after use. On the outer edges A–1 and B–1 of the ends of the members A and B, there are co-acting sockets 3 and knobs 4 to stabilize the members A and B when the case is closed. The members A and B are hingedly connected by a strip of suitable flexible plastic P adhered to the abutting outer edges A–2 and B–2 of the sides of the members A and B (FIGS. 2, 5 and 6). The strip P has a plurality of knobs P–1 seated in sockets P2 in the edges A–2 and B–2 of the members A and B (FIG. 6).

Figure 1:
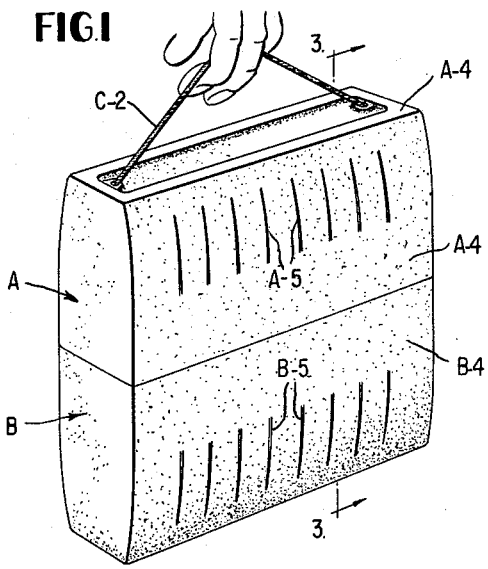
FIG. 1 is a perspective of the case in closed, carrying position.
Figure 3:
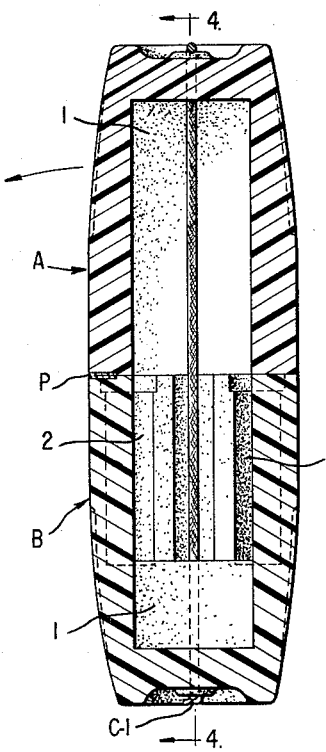
FIG. 3 is a vertical section on the line 3—3 of FIG. 1, in the direction of the arrows.

I provide an elastic cord C having its ends C–1 anchored in the bottom of the member B, passed loosely through vertical grooves A–3 and B–3 of the members A and B and the top A–4 of the member A, its bight C–2 serving as a handle for carrying the case when it is closed (FIG. 1).

The members A and B have smooth outer faces A–4 and B–4 on which the film F–1 may rest while being treated after use (FIG. 7). These faces A–4 and B–4 have a plurality of slits A–5 and B–5 into which the treated film F–1 may be inserted for drying (FIG. 7).

As shown in FIG. 8, a modified form of my case dispenses with the plastic hinge P, the members A and B being hingedly connected by a plurality of coil springs S in bores S–1 in the members A and B, their ends S–2 being suitably anchored in the inner ends of the bores S–1.

Having described my invention, what I claim is:

In a case for carrying photographic films, the combination of a pair of identical hollow members having abutting outer edges, respectively; a strip of flexible, plastic adhered to said edges to form a hinge connecting said members; and an elastic cord having one end anchored in one of said members, passed through both of said members, and its other end anchored in said member, adapted when tensioned to hold the members in closed position.

References Cited in the file of this patent
UNITED STATES PATENTS

| | | |
|---|---|---|
| 254,592 | Beiser | Mar. 7, 1882 |
| 623,054 | Weeks | Apr. 11, 1899 |
| 1,176,932 | Smith | Mar. 28, 1916 |
| 2,015,625 | Harrison | Sept. 24, 1935 |
| 2,089,440 | Sloan | Aug. 10, 1937 |
| 2,091,603 | Lemire | Aug. 31, 1937 |
| 2,289,037 | Poglein | July 7, 1942 |
| 2,499,254 | Parker | Feb. 28, 1950 |
| 2,552,641 | Morrison | May 15, 1951 |
| 2,903,814 | Greer | Sept. 15, 1959 |

FOREIGN PATENTS

| | | |
|---|---|---|
| 539,221 | Belgium | July 15, 1955 |
| 626,757 | France | May 21, 1927 |